May 10, 1938.  H. ABRAMS  2,116,551
CAMERA ADAPTED TO TAKE MOTION PICTURES AND STILL PICTURES
Filed Jan. 16, 1937
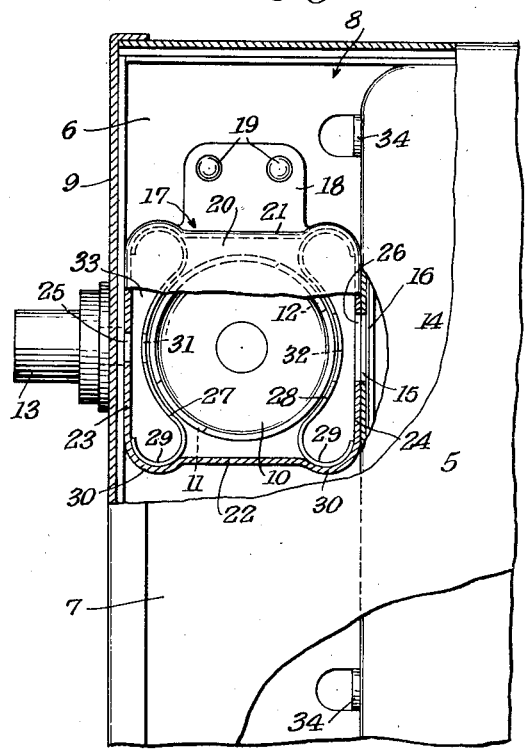
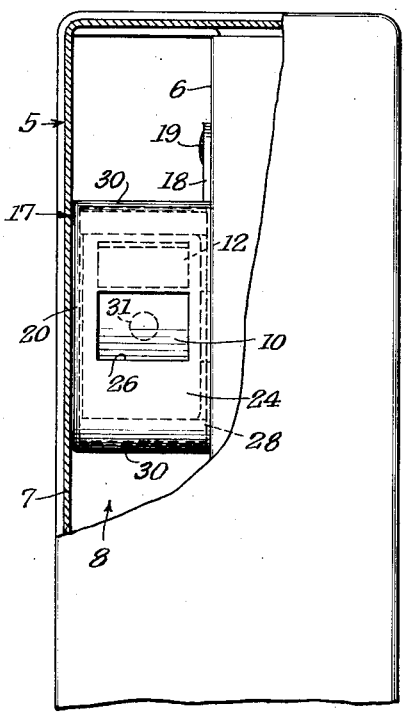
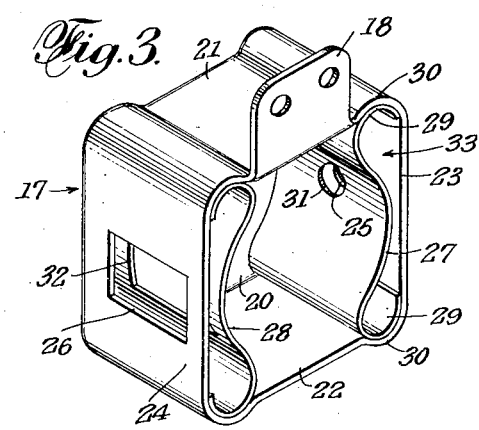
INVENTOR
HARRY ABRAMS
BY
ATTORNEY Patented May 10, 1938

2,116,551

UNITED STATES PATENT OFFICE 2,116,551

CAMERA ADAPTED TO TAKE MOTION PICTURES AND STILL PICTURES

Harry Abrams, Brooklyn, N. Y.

Application January 16, 1937, Serial No. 120,905

2 Claims. (Cl. 88—19.3)

This invention relates to camera shutters and more particularly to means for obviating light leakage and loss of light in the area between the camera lens and the film.

More specifically, the invention contemplates the provision of a light trap surrounding a barrel shutter and disposed between the camera objective and the film.

In its present form, it is contemplated to incorporate the light trap in a combined still and motion picture camera of the type disclosed in application Serial No. 102,698, filed September 26, 1936, wherein a film magazine of the cartridge type is slipped into position in relation to the barrel shutter and objective. It has been found that the efficiency of the camera was impaired by a considerable loss of light between the objective and the film and to light leakage around the shutter when the camera was not in use. An old and makeshift attempt to obviate part of these faults resided in using a plug of rubber or the like in the objective tube when the camera was out of use.

Cameras of the type indicated are as often used for stills or snapshots as for motion pictures. When so used, the portion of the film to be next exposed is inefficiently protected from light which may leak past the shutter particularly during long periods when the camera is out of use.

Hence, the invention has for its primary object the provision of means for increasing the efficiency of a camera of the type indicated by obviating the loss and leakage of light between the camera objective and the film.

With the foregoing in mind, the invention resides in the novel combination and arrangement of parts as illustrated in the accompanying drawing, in which a preferred form of the invention is disclosed, and in which:

Fig. 1 is a broken side view, partly in section of a camera incorporating the invention.

Fig. 2 is a similar rear view thereof.

Fig. 3 is a view in perspective of a light trap in its present contemplated form.

Referring to the drawing in greater detail, the camera case 5 is shown as being provided with a wall 6 longitudinally disposed and substantially midway between the side walls of the case. To one side of this wall, there is arranged the camera operating mechanism as disclosed in the previously mentioned application.

Between the wall 6 and the side wall 7 of the case 5, there is provided a chamber 8. Within this chamber and adjacent the front wall 9 of the case, a barrel shutter 10 is positioned, the shutter being operated in the usual manner by the mentioned mechanism. The shutter is provided with rectangular openings 11 and 12.

In alignment with the horizontal center line of the shutter, there is provided an objective 13, carried by the front wall 9, and comprising a lens and suitable optical assembly.

To the other side of the shutter 10 and also in alignment with shutter centerline, there is positioned a film magazine 14 of the cartridge type which is provided with a rectangular opening 15 in its wall adjacent the shutter for the exposure of the film 16 intermittently moved by the camera operating mechanism.

From the foregoing it will be apparent that when the openings 11 and 12 of the shutter are brought into alignment with the objective 13 and the magazine opening 15, that portion of the film 16 which is framed by the opening 15, will be exposed to light passing through the objective. This occurs intermittently as successive frames of the film are exposed.

When the camera comes to rest, the openings 11 and 12 of the shutter, assume an out-of-line position whereby direct light from the objective may not impinge on the film framed by the opening 15. In practice, however, it has been discovered that a considerable leakage of light occurs when the camera is out of operation due to reflection on the surface of the shutter and to inefficient absorption of light by the surfaces of the walls 6, 7, and 9, and the front wall of the film magazine. Similar light losses occur during the operation of the camera.

To correct this inefficiency, it has been found desirable to enclose the light path to obviate the mentioned light losses. The present contemplated manner of accomplishing this comprises a housing 17 positioned to enclose the shutter, and secured by means of its tab or lug 18 to the wall 6 as by means of screws or rivets 19.

In its present form the housing is provided with a side wall 20 arranged against the wall 7 of the camera case, top and bottom walls 21 and 22 respectively, a front wall 23 contiguous to, or in abutment with, the front camera wall 9, and a rear wall 24 in abutment with the front wall of the film magazine, the housing being closed at its open side by the wall 6. In the path of the light, the wall 23 is provided with an aperture 25, and the wall 24, with a rectangular opening 26.

The interior of the housing thus formed, when provided with light absorptive surfaces together with the shutter, will form an effective light trap to obviate the dissipation of light passing from the objective to the film.

In order to further improve the efficiency of the light trap, the housing is provided with similar oppositely disposed curved members 27 and 28, flanking the shutter which is free to rotate therebetween. These members are securely positioned within the housing by means of their oppositely curved ends 29 which are nested in curved seats 30 formed in the top and bottom walls of the housing. The member 27 is provided with an aperture 31 similar to the aperture 25 in the wall 23, and the member 28 is provided with a rectangular opening 32 similar to the opening 26 in the wall 24.

Because of the close proximity of the shutter with the members 27 and 28, this gap being between .005″ and .010″ in practice, an effective barrier is presented to light seeking its way to the film when the camera is out of use. Light from the objective will impinge upon that portion of the shutter which is exposed by the aperture 31 and will be absorbed in the chamber 33 formed between the housing wall 23 and the member 27. When the camera is in operation, the light will be guided to the film through the trap thus provided to afford high efficiency due to minimum light losses.

While the form of light trap herein disclosed is at present preferred, it is readily apparent that the structure may be varied within the scope of the invention. For instance, the members 27 and 28 may be integrally formed with the housing, or may be secured in the housing in other manners.

If desired, a gasket or pad may be interposed between the open side of the housing and the wall 6 as further insurance against leakage of light.

The magazine 14 being of the replaceable type, is readily and accurately positioned by merely being slid against the wall 24 of the light trap housing. However, in order to insure against inadvertent tilting of the magazine, lugs, such as shown at 34, may be struck from the wall 6 to also engage the magazine.

From the foregoing it is apparent that simple and highly efficient means have been provided for obviating the loss of light and leakage thereof in a camera of the type indicated. While of quite simple construction, it is obvious that skilled persons may vary the design in many ways. For this reason, the prior art rather than the instant detailed disclosure, should form the basis of determining the scope of the invention as claimed.

What I claim as new and desire to secure by Letters Patent, is:

1. A light trap of the character described comprising a housing positioned to surround a barrel shutter, oppositely curved members flanking said shutter, reentrantly curved end portions on the mentioned members, and curved seats in said housing for engagement with said reentrantly curved portions to maintain said members in spaced relation to the shutter.

2. A light trap of the character described comprising a housing positioned to surround a barrel shutter, oppositely curved members flanking said shutter, reentrantly curved end portions on the mentioned members, and curved seats in said housing for engagement with said reentrantly curved portions to maintain said members in spaced relation to the shutter, said members being provided with aligned openings out of alignment with the shutter openings when the shutter is at rest.

HARRY ABRAMS.